Feb. 8, 1927.
A. H. PENFIELD
TRACTION DEVICE
Filed Aug. 9, 1926  2 Sheets-Sheet 1
1,617,271
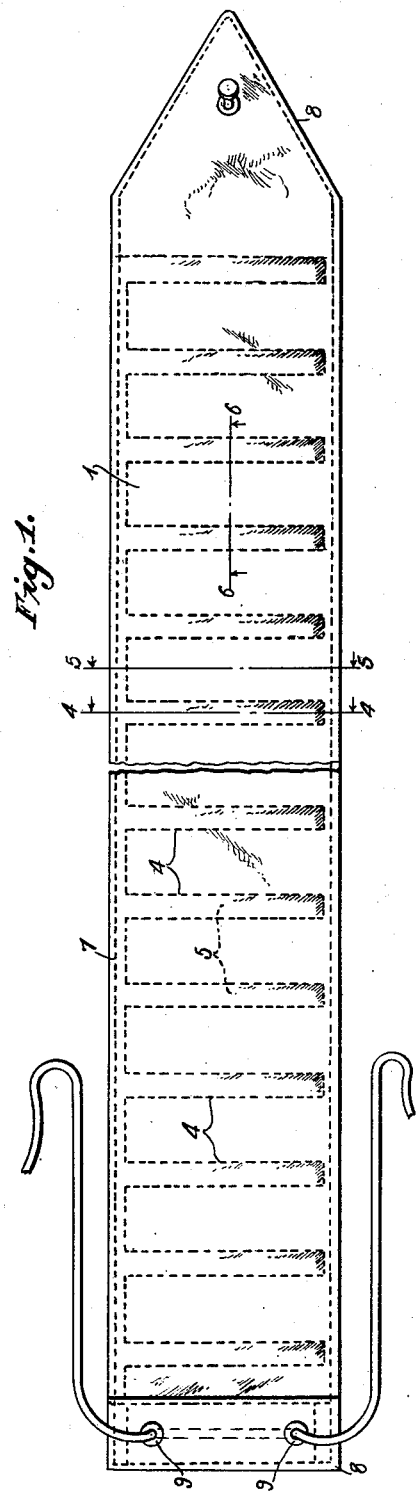
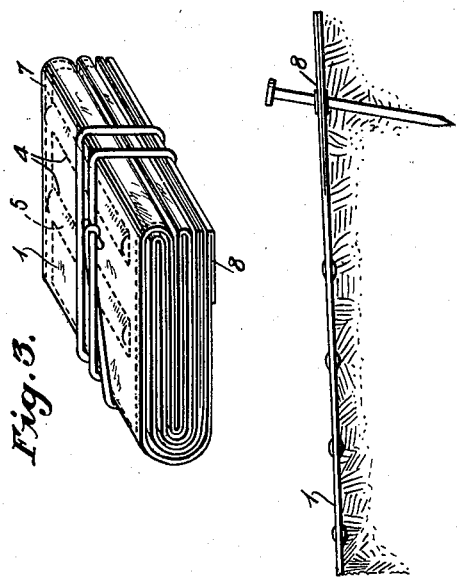
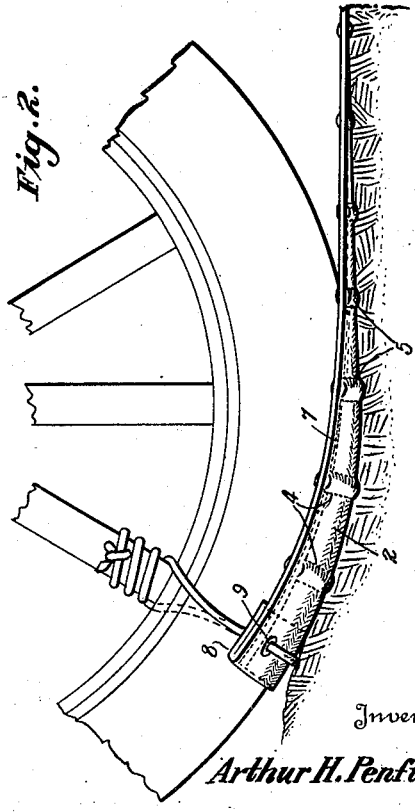
Inventor
Arthur H. Penfield
By Bacon & Thomas
Attorneys Feb. 8, 1927.  1,617,271
A. H. PENFIELD
TRACTION DEVICE
Filed Aug. 9, 1926    2 Sheets-Sheet 2
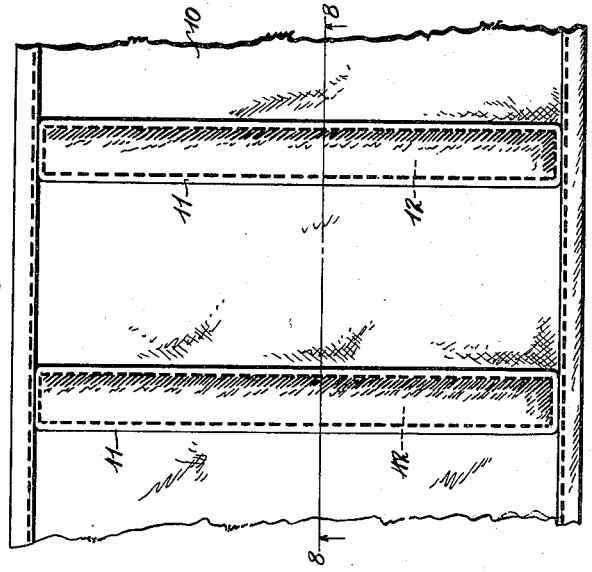
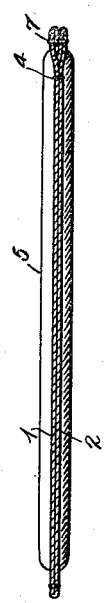
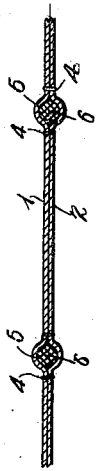
Inventor
Arthur H. Penfield
By Bacon & Thomas
Attorneys Patented Feb. 8, 1927.

1,617,271

UNITED STATES PATENT OFFICE.

ARTHUR H. PENFIELD, OF NEW YORK, N. Y.

TRACTION DEVICE.

Application filed August 9, 1926. Serial No. 128,235.

The invention relates to improvements in a traction device to be carried by motor vehicles to be used when the car becomes mired in sand, mud, snow or the like.

As is well known, automobiles frequently lose their traction when one or both of the rear wheels engage a slippery, sandy or muddy surface. This often happens when one wheel of the car leaves a highway. When it does happen much difficulty has been experienced in providing a satisfactory device by means of which a car under its own traction is moved from its mired condition.

The object of the present invention is to provide a device which may be easily carried in the car and may be positioned with reference to the wheels so as to provide a traction surface over which the wheels will travel when the car is mired in mud, clay, ice, or the like.

More specifically, the invention comprises a device of this character which is composed of flexible material carrying at spaced intervals transverse, flexible, anti-skid elements composed of rope, leather or any like material.

In accordance with this invention, I preferably use a pair of layers of a fabric such as waterproofed duck, leather or the like which may be placed over one another and sewed so as to provide spaced transverse slots adapted to receive strips of a flexible material such as rope. After these strips are inserted in the slots the layers of duck are sewed together, thereby retaining the rope strips in position.

In the accompanying drawings, Figure 1 represents a view looking on the top of the device, Figure 2 is a view of the traction device attached to a wheel, Figure 3 is a view of the traction device in a folded position, Figure 4 is a section view on line 4—4 of Figure 1 with the device under a wheel, Figure 5 is a section on line 5—5 of Figure 1, Figure 6 is a section on the line 6—6 of Figure 1, Figure 7 is a view of a modified form of the device, and Figure 8 is a section on line 8—8 of Figure 7.

Referring now more particularly to the drawings, wherein like reference characters indicate corresponding parts, the numerals 1 and 2 designate a pair of pieces or strips of waterproof fabric, such, for instance, as cotton duck that may be subjected to the desired waterproofing material. Leather or any flexible material may be used. These pieces may vary in length and width, but I have found that a strip 6 feet long and 9 inches wide is very useful for my purposes.

If the device is made of two strips, these strips are first sewed together along one side, and then sewed transversely as indicated by the reference character 4 to provide a series of transverse pockets 5 spaced apart, say a distance of 3 inches, and which pockets are adapted to receive pieces or strips of rope 6 inserted in the pockets. The rope may be of any standard type and I have found from use that a rope of one-half inch diameter is highly efficient in operation. While I have shown the skit inserts as being of rope, it is obvious that any other flexible material can be used.

After the ropes are inserted in the pockets the opposite edge of the superimposed strips 1 and 2 are sewed together as indicated by the stitches 7. This serves to lock or retain the anti-skid ropes 6 in the pockets formed between the plies 1 and 2.

At each end the plies 1 and 2 are reinforced by a rebent end of one of the plies, as indicated by the reference character 8. The device at its wide or wheel end is provided with a pair of eyelets 9, receiving ropes or the like by which the device is attached to the spokes of a wheel. The pointed end of the device constitutes the anchorage end having a single eyelet receiving a spike or the like to anchor the same.

It will be understood that when the article is not in use it is folded as shown in Figure 3 and can be carried in the car. It will be furthermore appreciated that by using the transverse anti-skid devices 5 which are constructed of rope and the like, there is no tendency for these devices to rupture or destroy the duck plies 1 and 2. They are, furthermore, freely flexible and will properly conform to the contour of the tire and road surface on which they are laid so as to offer a maximum tractor surface for the entire tread of the tire when the device is in use.

Assuming that the wheels of a car have become mired, the device is unfolded and laid over the road surface adjacent the traction portion of a wheel. When the power is applied to the car the wheels then ride over the surface presented by the surface of this device. An artificial roadbed is thereby provided, so that the car may move under its own power on to a firm non-slipping surface. As the entire device is flexible transversely the same will conform to the surface of the tire and thereby offer a wide traction surface whereby the car is sure to move from its mired position under its own power.

In Figure 7 but one strip of fabric 10 is used. Small strips 11 are sewed at spaced intervals to the body ply to provide the pockets 12 receiving the flexible traction elements 13.

Having thus described my invention, what I claim is:

1. A device of the character described, comprising a pair of superimposed flexible plies, and flexible transverse anti-skid devices interposed between said plies.

2. In a device of the character described, the combination with a pair of fabric plies stitched together one over the other, transverse stitching between said plies providing transverse pockets, and a piece of rope disposed in each of said pockets and extending transversely of said device.

3. A traction device comprising a foldable flexible strip of elongated formation and a series of spaced flexible traction elements extending laterally across said strip.

4. In an anti-skid device, the combination with an elongated body composed of fabric, and a series of spaced rope sections extending transversely across said body and retained thereon in spaced relation.

In testimony whereof I affix my signature.

ARTHUR H. PENFIELD.